US011230188B2

United States Patent
Hart et al.

(10) Patent No.: US 11,230,188 B2
(45) Date of Patent: Jan. 25, 2022

(54) HYDRAULICALLY ACTUATED TRANSFER CASE

(71) Applicant: GM Global Technology Operations LLC, Detroit, MI (US)

(72) Inventors: James M. Hart, Belleville, MI (US); Daryl A. Wilton, Macomb, MI (US); Robert L. Moses, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 16/526,368

(22) Filed: Jul. 30, 2019

(65) Prior Publication Data

US 2021/0031621 A1 Feb. 4, 2021

(51) Int. Cl.
*B60K 17/346* (2006.01)
*B60K 23/08* (2006.01)
*F16H 61/686* (2006.01)

(52) U.S. Cl.
CPC .......... *B60K 17/3462* (2013.01); *B60K 23/08* (2013.01); *F16H 61/686* (2013.01); *B60K 2023/0866* (2013.01)

(58) Field of Classification Search
CPC ................ B60K 17/3462; B60K 23/08; B60K 2023/0866; B60K 23/0808; B60K 2023/0825; B60K 17/3467; F16H 61/686; B60Y 2400/73; B60Y 2400/424; B60Y 2400/421; B60Y 2400/406; F16D 25/0638; F16D 25/12
See application file for complete search history.

(56) References Cited

U.S. PATENT DOCUMENTS

| 4,458,557 A | 7/1984 | Hayakawa |
| 5,916,051 A * | 6/1999 | Schleuder ........... F16H 63/3023 |
| | | 475/138 |
| 6,354,977 B1 | 3/2002 | Brown et al. |
| 7,004,873 B2 | 2/2006 | Dumitru |
| 7,021,445 B2 | 4/2006 | Brissenden et al. |
| 2002/0137591 A1* | 9/2002 | Frost .................... F16H 61/0206 |
| | | 475/288 |

(Continued)

FOREIGN PATENT DOCUMENTS

| CN | 103867684 A | 6/2014 |
| GB | 1018539 A | 1/1966 |

*Primary Examiner* — Justin Holmes
(74) *Attorney, Agent, or Firm* — Vivacqua Crane PLLC

(57) ABSTRACT

A drive torque transfer case is provided. The transfer case includes an input shaft, an output shaft, a gear assembly coupled to the input shaft, and a range clutch assembly coupled to the output shaft. The range clutch assembly includes a clutch member and a multi-piston actuator configured to receive a pressurized transmission fluid for selectively axially translating the clutch member to engage a component of the gear assembly for transmitting a drive torque from the input shaft to the output shaft. The multi-piston actuator includes an internal piston having a first annular surface area A1 and a third annular surface area A3, and an external piston having a second annular surface area A2 and a fourth annular surface area A4. The A1 and A2 are in hydraulic communication with a first hydraulic chamber, and A3 and A4 are in hydraulic communication with a second hydraulic chamber.

17 Claims, 7 Drawing Sheets

(56) References Cited

U.S. PATENT DOCUMENTS

| | | | |
|---|---|---|---|
| 2003/0085062 A1* | 5/2003 | Bowen | B60K 6/48 |
| | | | 180/65.1 |
| 2006/0042907 A1 | 3/2006 | Ronk et al. | |
| 2006/0058146 A1* | 3/2006 | Brissenden | F16D 48/02 |
| | | | 475/198 |
| 2014/0205468 A1* | 7/2014 | Pritchard | B60K 17/10 |
| | | | 417/53 |

* cited by examiner

HYDRAULICALLY ACTUATED TRANSFER CASE

The present disclosure relates to power transfer cases for controlling distribution of drive torque between the front and rear drivelines of a vehicle, more particularly to a hydraulically actuated transfer case.

Four wheel drive vehicles, such as light duty trucks, have a transfer case incorporated into the vehicular driveline for transferring drive torque between the primary and secondary output shafts. Typically, the primary output shaft delivers drive torque to the rear driveline and the secondary output shaft delivers drive torque to the front driveline.

Drive torque is transferred to the transfer case by an input shaft that is coupled to a transmission of the vehicle. The input shaft includes a reduction gear set. A range clutch assembly is provided on the primary output shaft for selectively coupling the primary output shaft to a component of the reduction gear set on the input shaft, thus selectively coupling the primary output shaft to the input shaft. The range clutch assembly may selectively engage a first component of the reduction gear set for direct drive and selectively engage a second component for reduction drive. The range clutch assembly may also be used to selectively disengage from the reduction gear set and to disengage the primary output shaft from the input shaft, thus placing the vehicle in neutral.

The transfer case is also equipped with a mode clutch assembly that can be selectively engaged for coupling the primary output shaft to the secondary output shaft by way of a drive belt or drive chain to deliver torque to establish a four-wheel drive mode. Drive torque is delivered to both the primary and secondary output shaft when the mode clutch assembly is engaged thus establishing a four-wheel drive mode. In contrast, torque is delivered to only the primary output shaft when the mode clutch assembly is disengaged thus establishing a two-wheel drive mode. The mode clutch assembly may also be selectively actuated, also referred to as modulated, to vary the distribution of torque delivered from the primary output shaft to the secondary output shaft.

Modern transfer cases are equipped with an electromechanical power-operated clutch actuator for selectively actuating the range clutch assembly and for selectively actuating the mode clutch assembly. An electronic control module is provided to receive commands by way of an electronic vehicle communications systems from an operator of the vehicle or vehicle control system for selectively actuating the range clutch and mode clutch assembly.

Electromechanical power-operated clutch actuators, electronic control modules, and electronic vehicle communications systems for the operating of the transfer cases are complex in terms of vehicle wiring requirements that may create an additional load on the vehicle electrical system and may be cost prohibitive in some four-wheel drive vehicles. Thus, while electromechanical actuation of transfer cases achieve their intended purpose, there exists a need to advance the technology and address recognized system limitations for the actuation of transfer cases that is reliable and cost effective.

SUMMARY

According to several aspects, a drive torque transfer case for a vehicle is disclosed. The drive torque transfer case includes an input shaft, an output shaft co-axially aligned with the input shaft, a gear assembly coupled to the input shaft, and a range clutch assembly coupled to the output shaft. The range clutch assembly includes a clutch member and a multi-piston actuator configured to receive a pressurized transmission fluid from a transmission for selectively axially translating the clutch member to engage a component of the gear assembly for transmitting a drive torque from the input shaft to the output shaft.

In an additional aspect of the present disclosure, the gear assembly includes a sun gear rotationally fixed to the input shaft, a ring gear fixed to the transfer case housing, and a planetary gear carrier having a plurality of planetary gears meshed between the sun gear and the ring gear. The clutch member is a dog clutch splined to the output shaft and axially translatable in a first axial direction and in an opposite second axial direction. The multi-piston actuator is configured to selectively axially translate the dog clutch into a first position, a second position, and a third position. The first position is in engagement with the sun gear, the second positon is engagement with the planetary carrier, and the third position is in a neutral non-engaged position.

In another aspect of the present disclosure, the multi-piston actuator includes a piston housing defined by a portion of an interior surface of the transfer case housing; an internal piston disposed within the piston housing, wherein the internal piston is axially slideable within the housing; and an external piston disposed within the piston housing, wherein the external piston is axially slideable against a surface of the internal piston. The external piston includes an exterior surface defining a shift fork in engagement with the dog clutch. The internal piston co-operates with the external piston to selectively axially translate the dog clutch into the first position, the second position, and the third position.

In another aspect of the present disclosure, the internal piston and the external piston are co-axially located on a longitudinal axis-A.

In another aspect of the present disclosure, the internal piston and the external piston are co-axially disposed on a longitudinal axis-B radially spaced from and parallel to the longitudinal axis-A.

In another aspect of the present disclosure, the drive torque transfer case further includes a piston sleeve disposed against a first surface of the piston housing, wherein the first surface is oriented toward longitudinal axis-A, and a piston housing end cap fitted against the piston sleeve adjacent the open end of the piston housing. The external piston cooperates with the interior piston, end cap, and piston sleeve to define a first hydraulic chamber. The external piston cooperates with the interior piston, an interior surface of the close end of the piston housing, and the piston sleeve to define a second hydraulic chamber.

In another aspect of the present disclosure, the internal piston includes a first annular surface having a first surface area A1 oriented toward the end cap and a third annular surface having a third surface area A3 oriented toward the closed end. The external piston includes a second annular surface having a second surface area A2 oriented toward the end cap and a fourth annular surface having a fourth surface area A4 oriented toward the closed end. The first annular surface and the second annular surface are in hydraulic communication with the first hydraulic chamber. The third annular surface and fourth annular surface are in hydraulic communication with the second hydraulic chamber.

In another aspect of the present disclosure, the third surface area A3 is greater than the first surface area A1 the second surface area A2 is greater than the fourth surface area A4; and a total of the first surface area and second surface area (A1+A2) is less than a total of the third surface area and fourth surface area (A3+A4).

In another aspect of the present disclosure, the drive torque transfer case further includes a mode clutch assembly having a clutch housing rotationally fixed to a drive sprocket, a hub rotationally fixed to the output shaft, a multi-plate clutch pack configured for selectively transmit drive torque from the hub to the clutch housing, and a mode-piston actuator configured to actuate the multi-plate clutch pack. The mode-piston actuator is configured to receive a pressurized transmission fluid for selectively axially translating a piston to engage the multi-plate cutch pack for transmitting a drive torque from the hub to the clutch housing and thus to the drive sprocket.

In another aspect of the present disclosure, the drive torque transfer case further includes a valve body defined in the transfer case housing for selectively hydraulically communicating the first hydraulic chamber and second hydraulic chamber of the range clutch assembly, and the mode-piston actuator with a source of pressurized transmission fluid.

According to several aspects, a multi-piston actuator for a transfer case is disclosed. The multi-piston actuator includes a piston housing disposed about an axis-A. The piston housing includes a first surface facing the axis-A, a second surface facing away from the axis-A, a closed end having a closed end surface interconnecting the first surface and the second surface, and an open end opposite the closed end. The multi-piston actuator further includes a piston sleeve disposed against the first surface, an end cap fitted against the piston sleeve adjacent the open end of the piston housing, and an external piston and an internal piston co-axially disposed within the piston housing. The external piston cooperates with the internal piston to selectively axially translate a shift fork into a first position, a second position, and a third position.

In an additional aspect of the present disclosure, the external piston cooperates with the interior piston, end cap, and piston sleeve to define a first hydraulic chamber. The external piston cooperates with the interior piston, an interior surface of the close end, and the piston sleeve to define a second hydraulic chamber. The piston housing defines a valve body and a network of passageways in hydraulic communication with the valve body, the first hydraulic chamber, and the second hydraulic chamber. The valve body is configured to receive a pressurized transmission fluid and selectively communicate the pressurized transmission fluid with the first and second hydraulic chambers.

In another aspect of the present disclosure, the internal piston includes a first annular surface having a first surface area A1 oriented toward the end cap and a third annular surface having a third surface area A3 oriented toward the closed end. The external piston includes a second annular surface having a second surface area A2 oriented toward the end cap and a fourth annular surface having a fourth surface area A4 oriented toward the closed end.

In another aspect of the present disclosure, the third surface area A3 is greater than the first surface area A1 the second surface area A2 is greater than the fourth surface area A4; and a total of the first surface area and second surface area (A1+A2) is less than a total of the third surface area and fourth surface area (A3+A4).

In another aspect of the present disclosure, the first annular surface and the second annular surface are in hydraulic communication with the first hydraulic chamber. The third annular surface and fourth annular surface are in hydraulic communication with the second hydraulic chamber.

In another aspect of the present disclosure, the internal piston cooperates with the piston sleeve to define a third hydraulic chamber, the external piston cooperates with the internal piston to define a fourth hydraulic chamber, and the internal piston defines a hydraulic passageway in hydraulic communication with the third and fourth hydraulic chambers.

In another aspect of the present disclosure, the valve body is further configured to selectively vent hydraulic transmission from the third hydraulic chamber and the fourth hydraulic chamber.

According to several aspects, a hydraulically actuated transfer case is disclosed. The hydraulically actuated transfer case includes a range clutch assembly having a multi-piston actuator configured to receive a pressurized transmission fluid for selectively axially translating a clutch member, and a mode clutch assembly having a mode-piston actuator configured to receive the pressurized transmission fluid for selectively axially translating a piston.

In an additional aspect of the present disclosure, the range clutch assembly includes: a piston-housing having an open portion and an opposite closed portion; a piston sleeve disposed against a first surface of the piston housing; a piston housing end cap fitted against the piston sleeve adjacent the open portion of the housing; an internal piston slideably disposed against the piston sleeve; and an external piston slideably disposed against the internal piston and a portion of the piston housing end cap. A first hydraulic chamber is defined between the piston sleeve, piston housing end cap, internal piston, and external piston. A second hydraulic chamber defined by defined between the piston sleeve, the closed portion of the piston housing, internal piston, and external piston.

In another aspect of the present disclosure, the internal piston includes a first annular surface having a first surface area A1 oriented toward the end cap and a third annular surface having a third surface area A3 oriented toward the closed end; and the external piston includes a second annular surface having a second surface area A2 oriented toward the end cap and a fourth annular surface having a fourth surface area A4 oriented toward the closed end. The third surface area A3 is greater than the first surface area A1. The second surface area A2 is greater than the fourth surface area A4. The total of the first surface area and second surface area (A1+A2) is less than a total of the third surface area and fourth surface area (A3+A4).

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
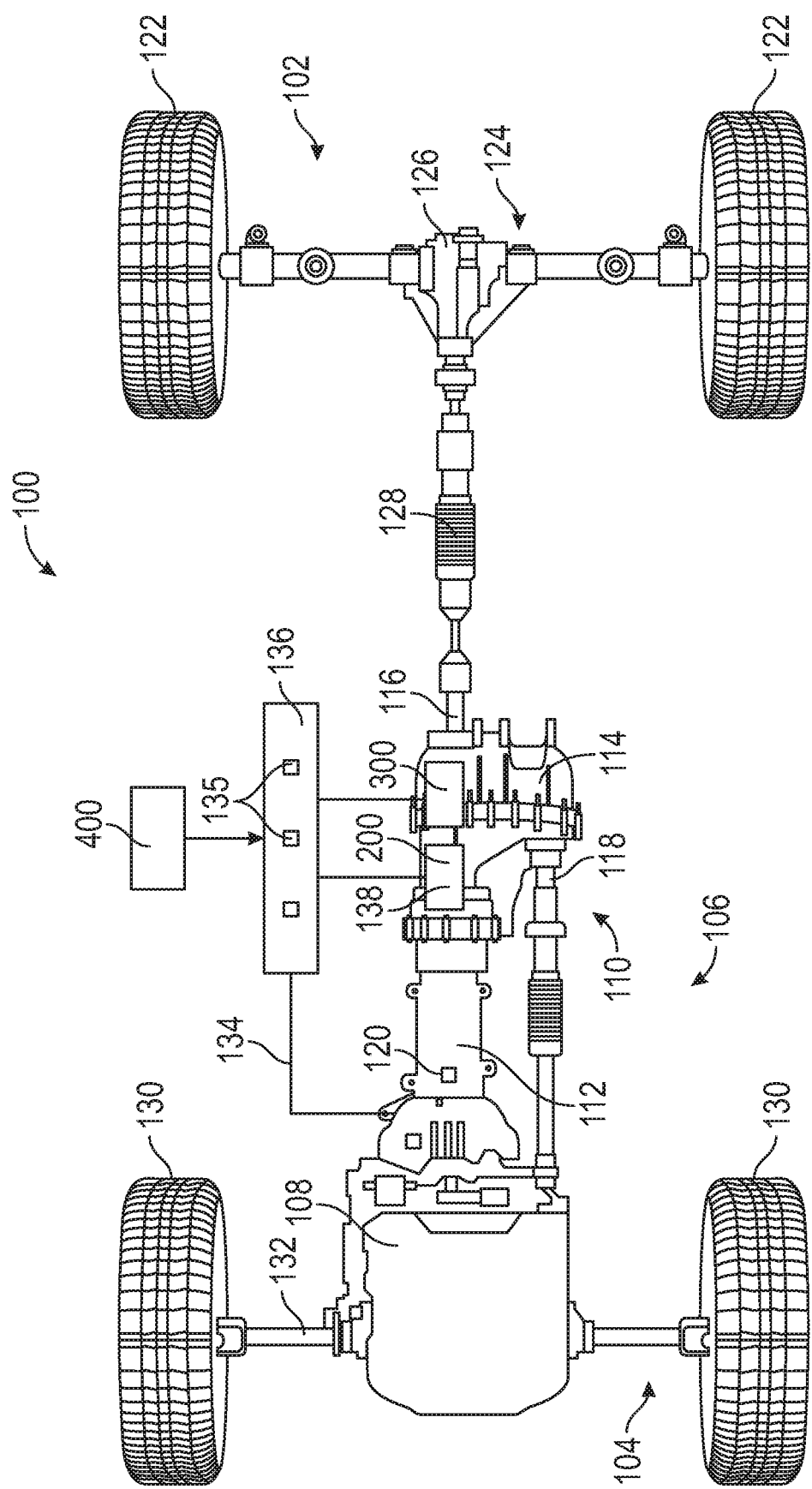
FIG. 1 is a schematic of a drivetrain for a four-wheel drive vehicle having a hydraulically actuated drive range selector and drive mode selector, according to an exemplary embodiment.

FIG. 1 shows a drivetrain 100 for a four-wheel drive vehicle. The drivetrain 100 includes a primary driveline 102, a secondary driveline 104, and a powertrain 106 for delivering rotary power, also known as drive torque, to the primary and secondary drivelines 102, 104. In the particular embodiment shown, the primary driveline 102 is the rear driveline while the secondary driveline 104 is the front driveline. The powertrain 106 includes an engine 108 configured to output a drive torque and a torque transfer system 110 for selectively transferring the drive torque to the rear and front drivelines 102, 104 for selectively establishing a two-wheel low range drive mode, a two-wheel high range drive mode, a four-wheel low range drive mode, a four-wheel high range drive mode, and a neutral non-driven mode. The four-wheel high range drive mode may be full time four-wheel mode or on demand four-wheel mode.

The torque transfer system 110 includes a multi-speed transmission 112 and a transfer case 114 having a rear output shaft 116 and a front output shaft 118. The multi-speed transmission 112 includes a pressurized transmission fluid source 120 such as a transmission pump or pressurized transmission fluid sump. The multi-speed transmission 112 may be of that of a manual type transmission or an automatic type transmission connected to an input shaft 141 (shown in FIG. 2) of the transfer case 114. The rear driveline 102 includes a pair of rear wheels 122 connected at opposite ends of a rear axle assembly 124 having a rear differential unit 126. A rear drive shaft 128 interconnects the rear differential unit 126 to the rear output shaft 116 of the transfer case 114. Similarly, the front driveline 104 includes a pair of front wheels 130 connected at opposite ends of a front axle assembly 132.

Figure 2:
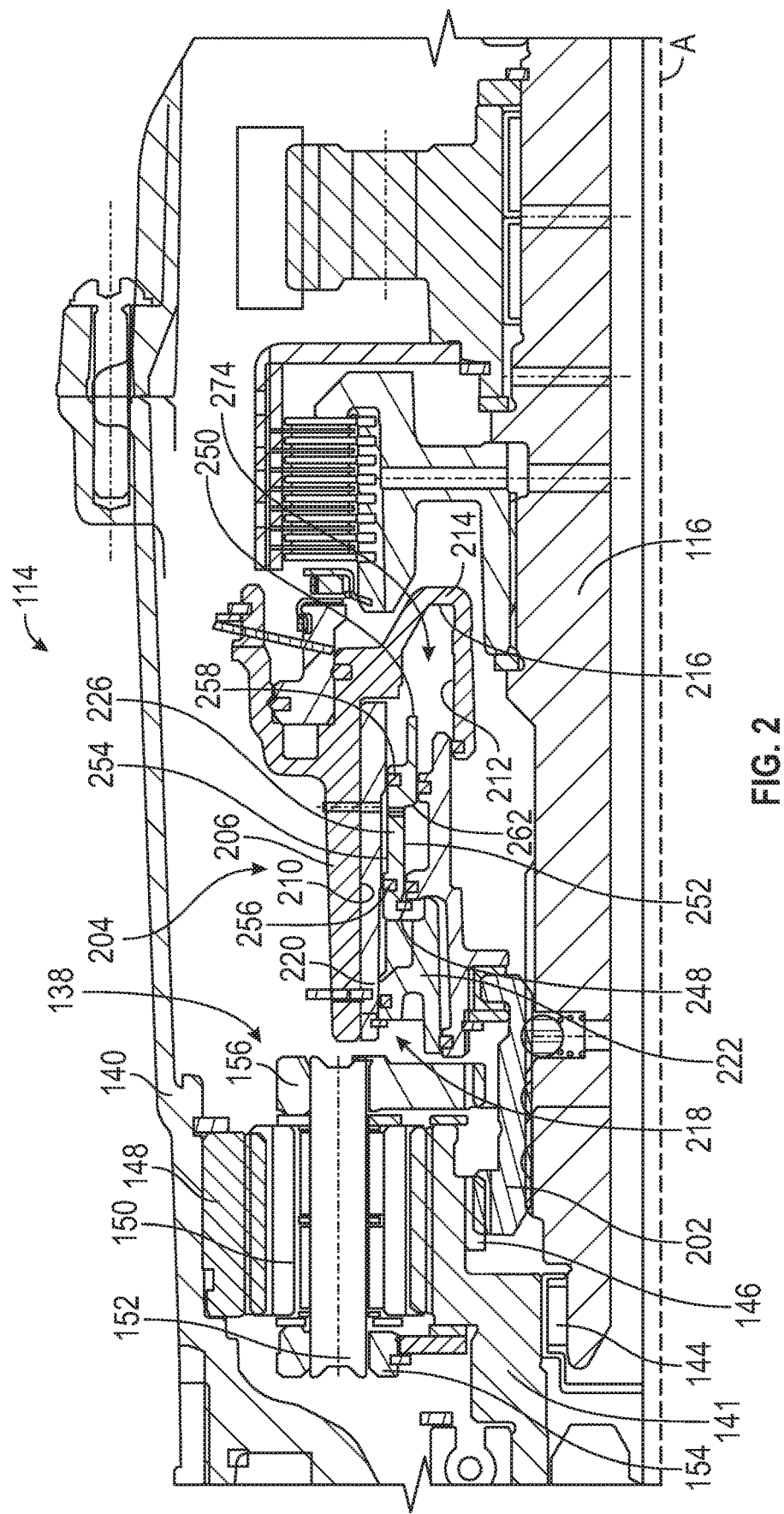
FIG. 2 is a partial cross-sectional view of a torque transfer case showing a dog clutch in a first position, according to an exemplary embodiment.

Referring to both FIGS. 1 and 2, the transfer case 114 is equipped with a range clutch assembly 200 operable to engage a component of a planetary gear assembly 138 for establishing a high-range, low-range, and neutral connections between the input shaft 141 and the rear output shaft 116. The transfer case 114 also includes a mode cutch assembly 300 that is operable for selectively transferring drive torque from the rear output shaft 116 to the front output shaft 118 for establishing two-wheel drive mode and four-wheel drive mode. Both of the range clutch assembly 200 and mode clutch assembly 300 are operated by a pressurized transmission fluid supplied by the transmission 112. The torque transfer system 110 also includes a controller 400 configured to receive an input from a driver or engine control module and generates a signal to command a series of electric-mechanical solenoids 135 located within a valve body 136 defined within a portion of the transfer case 114 to control the range clutch assembly 200 and mode clutch assembly 300.

Figure 3:
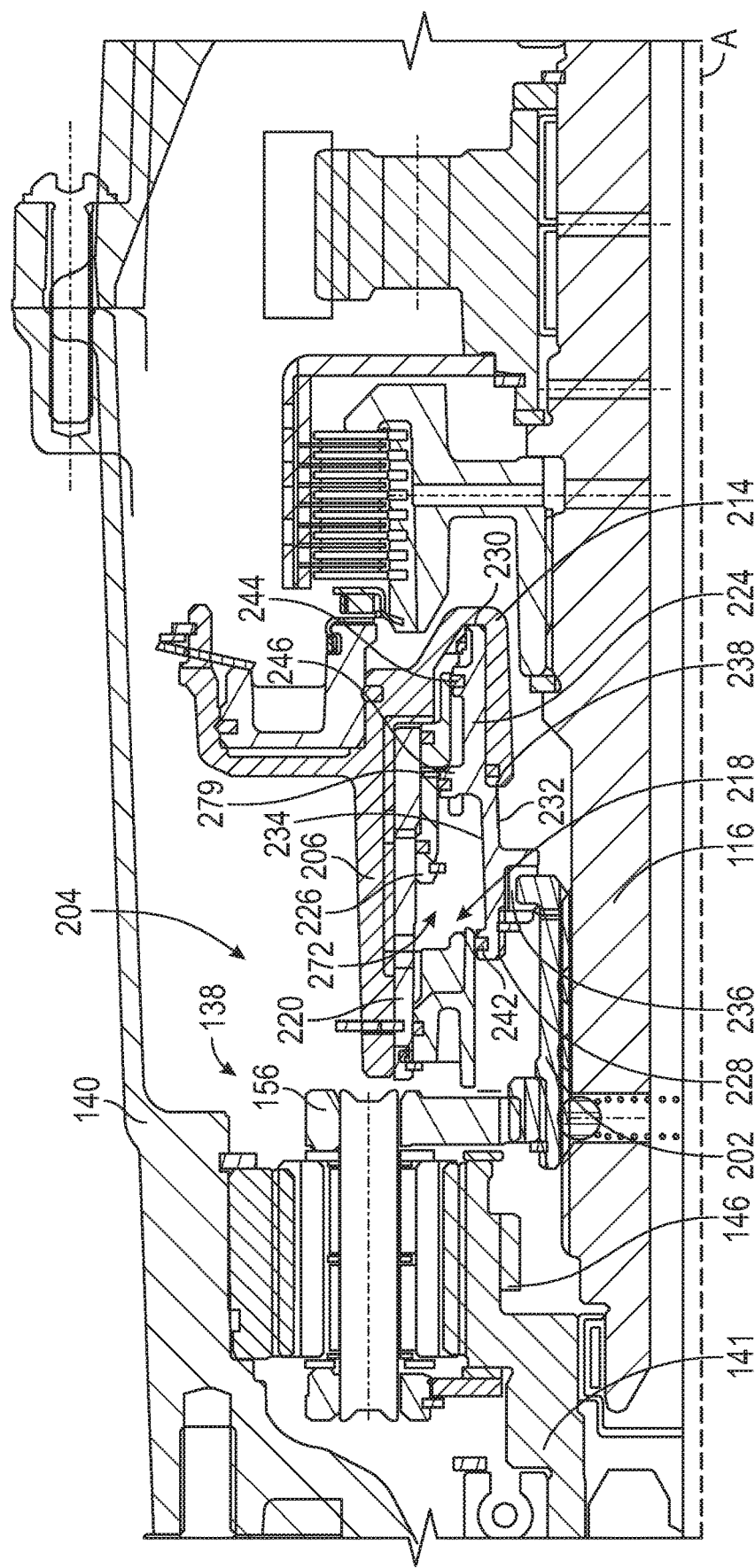
FIG. 3 is the torque transfer case of FIG. 2 showing the dog clutch in a second position, according to an exemplary embodiment.
Figure 4:
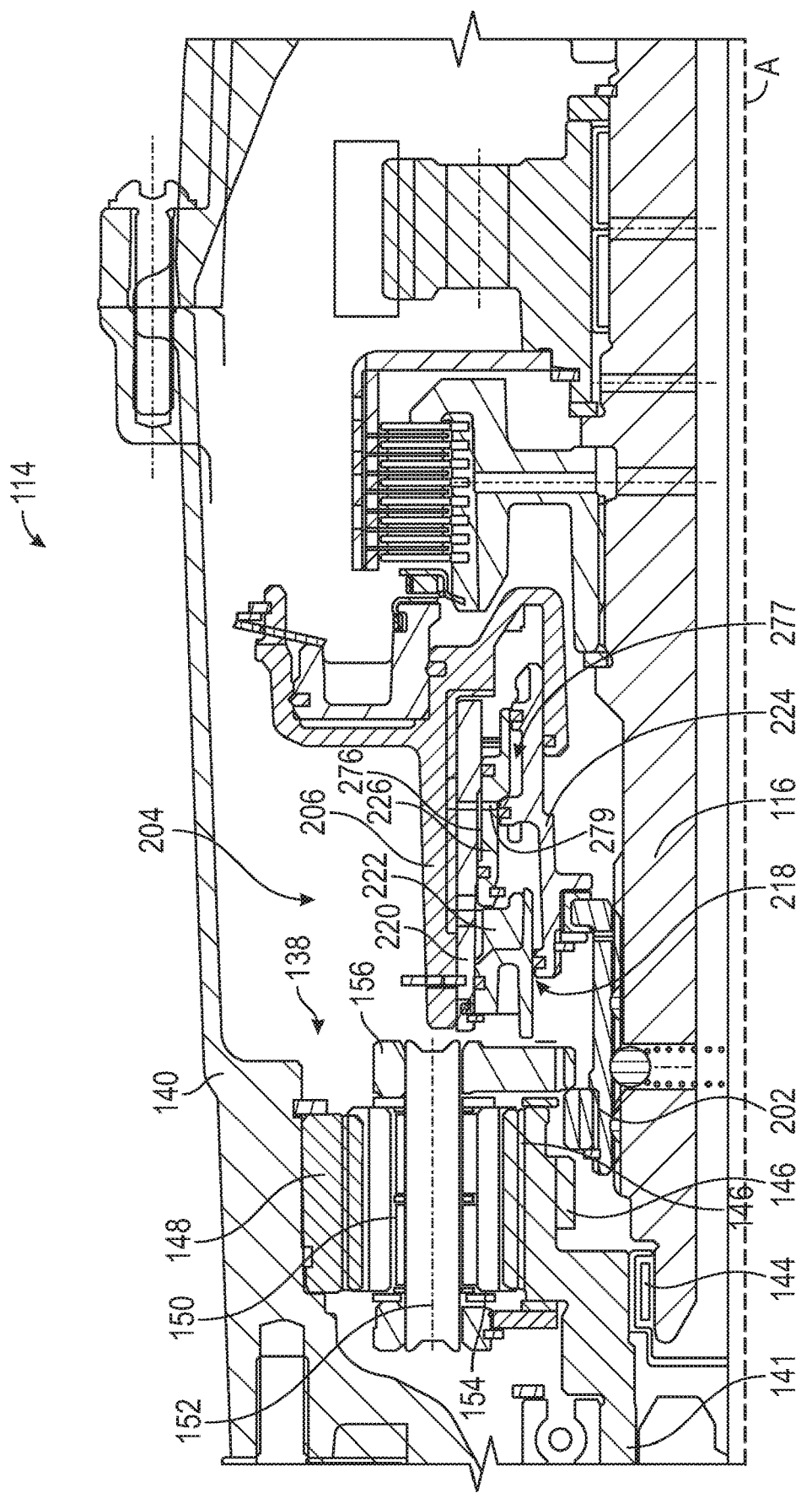
FIG. 4 the torque transfer case of FIG. 2 showing the dog clutch in a third position, according to an exemplary embodiment.

Referring to FIGS. 2 through 4, the transfer case 114 includes a housing 140 from which the input shaft 141 and the rear output shaft 116 are rotatably supported. The input shaft 141 is co-axially aligned with the rear output shaft 116 along a longitudinal axis (A) and are piloted via bearing assembly 144 such that the input shaft 141 is capable of rotating independently from the rear output shaft 116. The range clutch assembly 200 and mode clutch assembly 300 are arranged symmetrically about the longitudinal axis (A). For clarity of illustration, only those components above the longitudinal axis (A) are shown.

The input shaft 141 includes a planetary gear assembly 138 having a sun gear 146 connected to the input shaft 141 such that the sun gear 146 is fixed for common rotation with the input shaft 141, a ring gear 148 non-rotatably fixed to the housing 140 of the transfer case 114, and a set of planet gears 150 rotatably supported on pinion shafts 152 extending between a first and second carrier rings 154, respectively, that are interconnected to define a planetary gear carrier 156. The planetary gear assembly 138 functions as a speed reduction unit which is operable to establish either of a first or second drive range between input shaft 141 and rear output shaft 116. The first drive range is a direct drive, also referred to as a high-range drive, and the second drive range is a low-range drive.

The range clutch assembly 200 includes a dog clutch 202 splined to the rear output shaft 116 and a multi-piston actuator 204 operable to selectively translate the dog clutch 202 in a first axial direction (shown as toward the left), with respect to the longitudinal axis A, and in an opposite second axial direction (shown as toward the right). The multi-piston actuator 204 is operated by a pressurized transmission fluid supplied by a readily available pressurized transmission fluid source 120 located within the transmission 112. The controller 400 generates and transmits a control signal to a plurality of electrically operated solenoids 135 located in a valve body 136 defined in the transfer case housing 140 to selectively translate the dog clutch 202 in the first axial direction and in the second axial direction.

Referring to FIG. 2, the dog clutch 202 is translated in the first axial direction to a first position, in which the dog clutch 202 is in engagement with the sun gear 146, thus rotationally coupling the rear output shaft 116 to the input shaft 141 in a direct drive ratio. Referring to FIG. 3, the dog clutch 202 is translated in the second axial direction to a second position, in which the dog clutch 202 is in engagement with the carrier 156, thus rotationally coupling the output shaft 116 to the input shaft 141 in a low drive range. Referring to FIG. 4, the dog clutch 202 is translated in an axial direction to a third position or neutral position, in which the dog clutch 202 is in a non-engagement, non-contact arrangement, position shown as between the sun gear 146 and the carrier 156, thus rotationally decoupling the input shaft 141 from the rear output shaft 116.

Best shown in FIG. 2, the multi-piston actuator 204 includes a piston housing 206 disposed within the transfer case housing 140. The piston housing 206 includes a first surface 210 facing the longitudinal axis-A, a second surface 212 facing away from the longitudinal axis-A, a closed end 214 interconnecting the first surface 210 and the second surface 212, and an open end 218 opposite the closed end 214. A piston sleeve 220 is disposed against the first surface 210. Best shown in FIG. 5, a piston housing end cap 222 is fitted against the piston sleeve 220 adjacent the open end 218 of the piston housing 206. The multi-piston actuator 204 further includes an external piston 224 and an internal piston 226 co-axially disposed within the piston housing 206. The external piston 224 cooperates with the internal piston 226 to selectively axially translate the dog clutch 202 to the first position (shown in FIG. 2), second position (Shown in FIG. 3), and third position (shown in FIG. 4).

Figure 5:
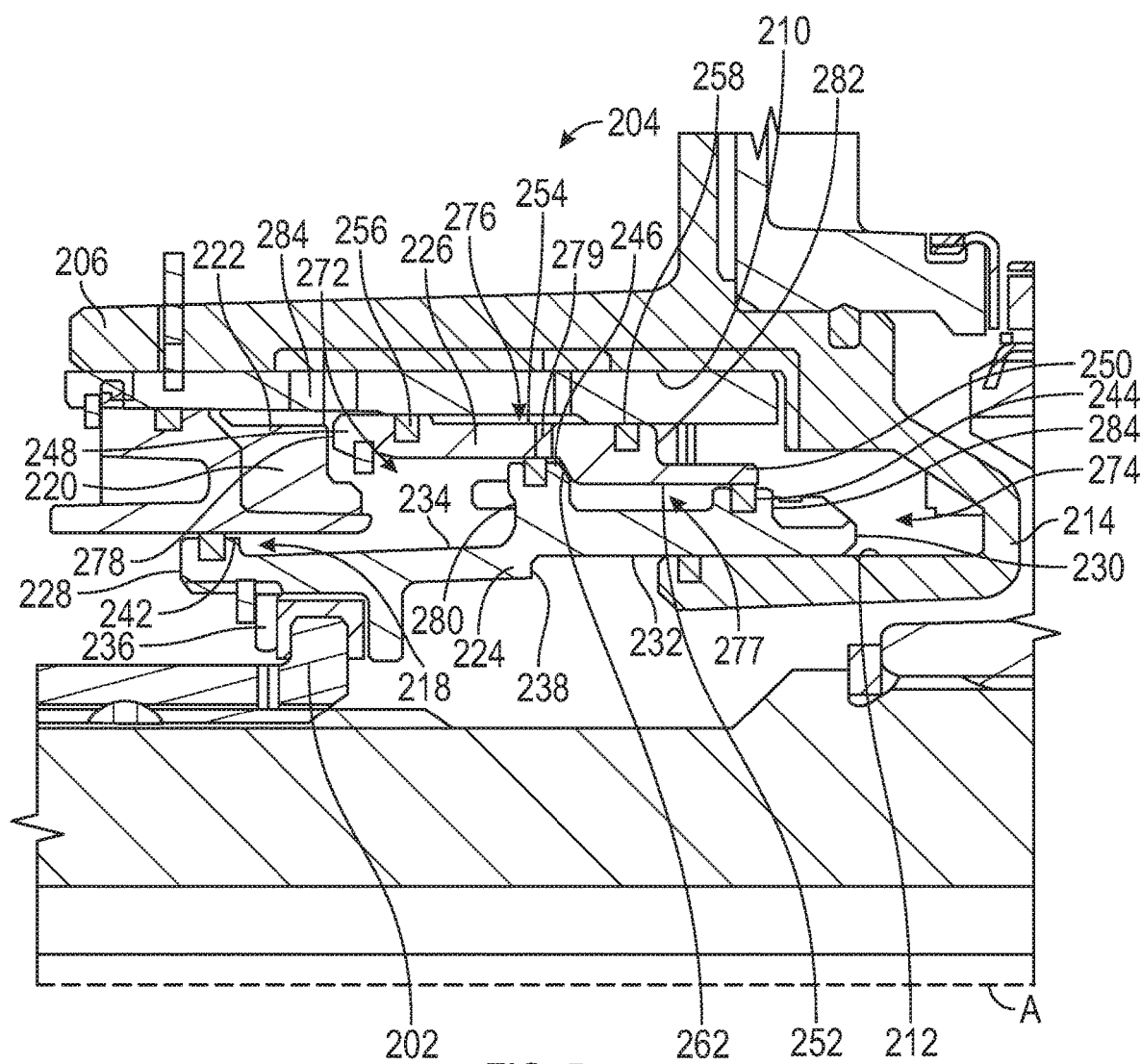
FIG. 5 is a detail view of a drive range selector having a multi-piston actuator.

Referring to FIG. 5, the external piston 224 includes a first end 228 oriented toward the end cap 222 and an opposite second end 230, an exterior surface 232 facing the longitudinal axis-A and an opposite facing interior surface 234. The exterior surface 232 defines a shift fork 236 proximal to the first end 228, in which the shift fork 236 is configured to engage the dog clutch 202, and an annular shoulder 238 between the shift fork 236 and the second end 230. A portion of the exterior surface 232 between the annular shoulder 238 and the second end 230 is slideably disposed against the second surface 212 of the piston housing 206. The interior surface defines a first flange surface 242 adjacent the first end 228 slideably abutting the end cap 222 and a second flange surface 244 proximal the second end 230. The interior surface 234 further defines a third flange surface 246 between the first flange surface 242 and the second flange surface 244 proximal to the annular shoulder 238.

Still referring to FIG. 5, the internal piston 226 includes a first end 248 oriented toward the end cap 222 and an opposite second end 250, an exterior surface 252 facing the longitudinal axis-A and an opposite facing interior surface 254. The interior surface 254 of the internal piston 226 includes a first flange surface 256 and a second flange surface 258 spaced from the first flange surface 256. The first flange surface 256 and the second flange surface 258 are slideably disposed against the piston sleeve 220. The exterior surface 252 of the internal piston 226 defines an annular shoulder 262 between the first end 248 and the second end 250.

The external piston 224 is slideably disposed against the internal piston 226 such that the second flange surface 244 and the third flange surface 246 of the external piston 224 are slideably positioned against the exterior surface 252 of the internal piston 226. The external piston 224 cooperates with the interior piston 226, end cap 222, and piston sleeve 220 to define a first hydraulic chamber 272. The external piston 224 also cooperates with the internal piston 226, the close end 214, and piston sleeve 220 to define a second hydraulic chamber 274. The first flange surface 256 and the second flange surface 258 of the internal piston 226 cooperate with the piston sleeve 220 to define a third hydraulic chamber 276 therebetween. The external piston 224 cooperates with the internal piston 226 to define a fourth hydraulic chamber 277 between the third flange surface 246 and the second flange 244 surface of the external piston 224. The third hydraulic chamber 276 is vented to atmosphere via vent holes 279 in order to avoid any buildup of positive or negative pressure which might impede the sliding motion of the pistons 224, 226.

The internal piston 226 includes a first annular surface 278 having a surface area of A1 oriented toward the end cap 222. The external piston 224 includes a second annular surface 280 having a surface area of A2 oriented toward the end cap 222. The first annular surface 278 and second annular surface 280 are in hydraulic communication with the first hydraulic chamber 272. The internal piston 226 includes a third annular surface 282 having a surface area of A3 oriented toward the closed end 214. The external piston 224 includes a fourth annular surface 284 having a surface area of A4 oriented toward the closed end 214. The third annular surface 282 and fourth annular surface 284 are in hydraulic communication with the second hydraulic chamber 274. The third surface area A3 is greater than the first surface area A1. The second surface area A2 is greater than the fourth surface area A4. A total of the first surface area and second surface area (A1+A2) is less than a total of the third surface area and fourth surface area (A3+A4). The sum of the second surface area A2 minus the fourth surface area A4 plus the first surface area A1 is less that than the third surface area A3 as represented by [(A2−A4)+A1]<A3. Table 1 presents non-limiting exemplary surface areas A1, A2, A3, and A4 for annular surfaces 278, 280, 282, 284, respectively.

TABLE 1

| Surface Area | Area (mm^2) | Combined Areas (mm^2) |
|---|---|---|
| A1 | 1189.01 | A1 + A2 = 2929.73 |
| A2 | 1740.72 | |
| A3 | 1617.01 | A3 + A4 = 3166.72 |
| A4 | 1549.71 | |

The piston housing 206 and piston sleeve 220 defines a network of hydraulic passageways in fluid communication with the first hydraulic chamber 272, the second hydraulic chamber 274, the third hydraulic chamber 276, and fourth hydraulic chamber 277. The network of hydraulic passageways are in hydraulic communication with the valve body 136, which contains a plurality of solenoid actuators 135 actuated by a signal sent by the controller 400 for selectively controlling pressurized transmission fluid flow into and out of the first, second, third, and fourth hydraulic chambers 272, 274, 276, 277.

Referring FIG. 2 and FIG. 5 upon pressurization of the second hydraulic chamber 274 by filling the second hydraulic chamber 274 with pressurized transmission fluid and depressurization of the first hydraulic chamber 272, the pressurized transmission fluid acts on the third and fourth annular surfaces 282, 284 having respective surface areas A3, A4 to urge the internal piston 226 and external piston 224 to the left thus moving the dog clutch 202 to engage the sun gear 146 and enabling high range mode. Referring to FIG. 3 and FIG. 5, upon pressurization of the first hydraulic chamber 272 and depressurization of the second hydraulic chamber 274, the transmission fluid acts on the first and second annular surface 278, 280 having respective surface areas A1, A2 to urge the internal piston 226 and external piston 224 to the right thus moving the dog clutch 202 to engage the planetary gear carrier 156 and enabling low range mode. Referring to FIG. 4 and FIG. 5, upon pressurization of both the first and second hydraulic chambers 272, 274, the static transmission fluid pressure acting on the first and second annular surfaces 278, 280 (A1, A2) balances out the static transmission fluid pressure acting on third and fourth annular 282, 284 surfaces (A3, A4) such that the dog clutch 202 is positioned between, and not engaging, the sun gear 146 and planetary gear carrier 156. The third and fourth hydraulic chambers 276, 277 are vented to atmospheric pressure via strategically placed vent holes 279. Table 2 presents a summary of the effects of selective application of static transmission fluid pressure onto the first, second, third, and fourth annular surfaces 278, 280, 282, 284 having respective first, second, third, and fourth surfaces areas A1, A2, A3, and A4.

TABLE 2

| Mode | Application of Transmission Fluid Pressure | Effect |
| --- | --- | --- |
| High Range | A3 and A4 | Both Pistons Slides Left |
| Low Range | A1 and A2 | Both Pistons Slides Right |
| Neutral | A1 < A3 | Internal Piston Slides Left |
|  | A2 > A4 | External Piston Slides Middle |
|  | A1 + A2 < A3 + A4 or | External Piston Static and |
|  | [(A2 − A4) + A1] < A3 | Internal Piston Slides Right |

Figure 6:
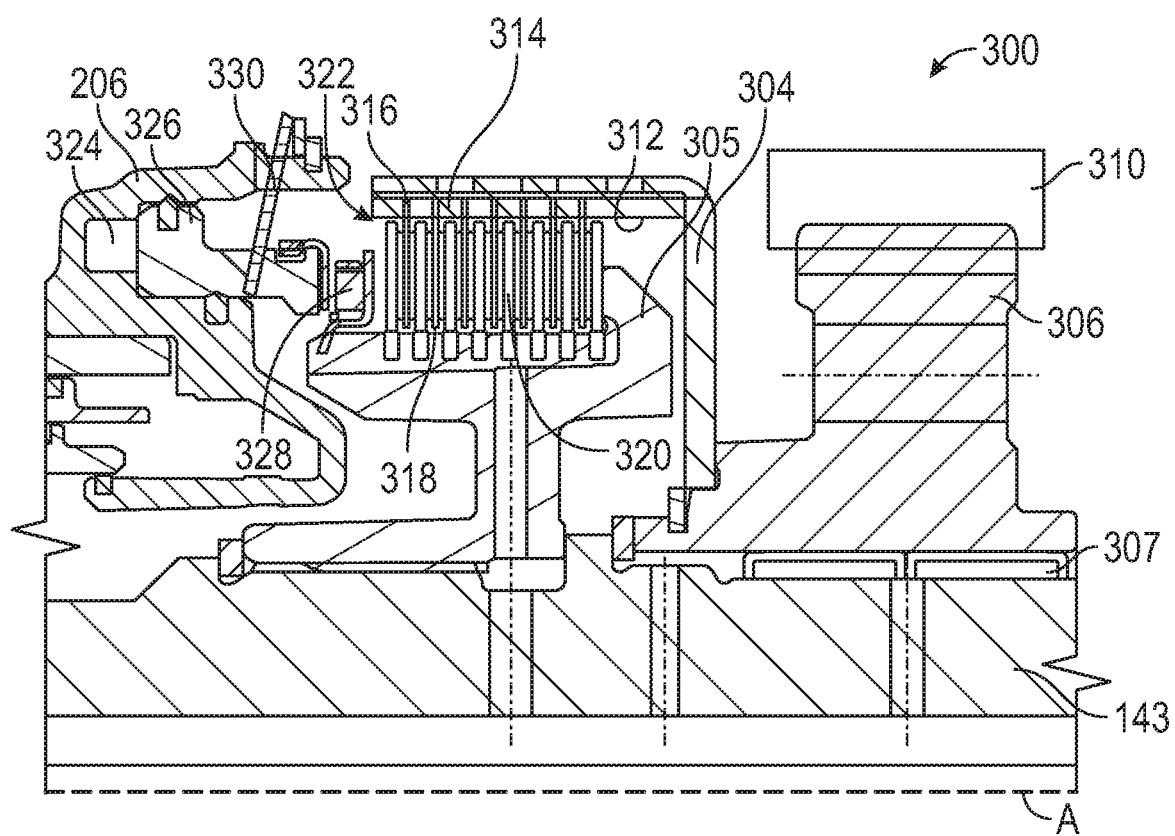
FIG. 6 is a detail view of a drive mode selector having a piston actuator.

Referring to FIG. 6 the mode clutch assembly 300 is also is operated by pressurized transmission supplied by a readily available pressure transmission fluid source located within the transmission 112, such as the transmission pump. The mode clutch assembly 300 includes a clutch housing 304 rotationally fixed to a drive sprocket 306 and a hub 305 rotationally fixed to the rear output shaft 116. The drive sprocket 306 is rotatably supported on the rear output shaft 116 via a bearing assembly 307 and a driven sprocket (not shown) is rotationally fixed to front output shaft. A power transfer device 310, such as chain or belt interconnects the drive sprocket 306 to the driven sprocket.

The clutch housing 304 includes an interior surface 312 defining a splined portion 314 having a plurality of axially moveable first clutch plates 316 mounted on the spline portion 314. The hub 305 includes an interior surface defining a splined portion 318 having a plurality of axially moveable second clutch plates 320 mounted on the spline portion 318. The first clutch plates 316 are interleaved with the second clutch plates 320 defining a multi-plate clutch pack 322.

A portion of the piston housing 206 defines a piston chamber 324 in which a hydraulic piston 326 is slideably disposed. The hydraulic piston 326 includes a distal end 328 configured to engage and transmit an axial force against the first end plate of the multi-plate clutch pack 322 when a pressurized transmission fluid is provided in the piston chamber 324. Axial movement of the hydraulic piston 326 functions to vary or modulate the frictional compressive force exerted on multi-plate clutch pack 322 for regulating a speed differentiation and biasing the torque distribution between rear output shaft 116 and front output shaft 118. When the hydraulic pressure in the piston chamber 324 is reduced, a biasing member 330 urges the hydraulic piston 326 apart from the multi-plate clutch pack 322, thereby rotationally unlocking the output shaft 116 and drive sprocket 306.

Figure 7:
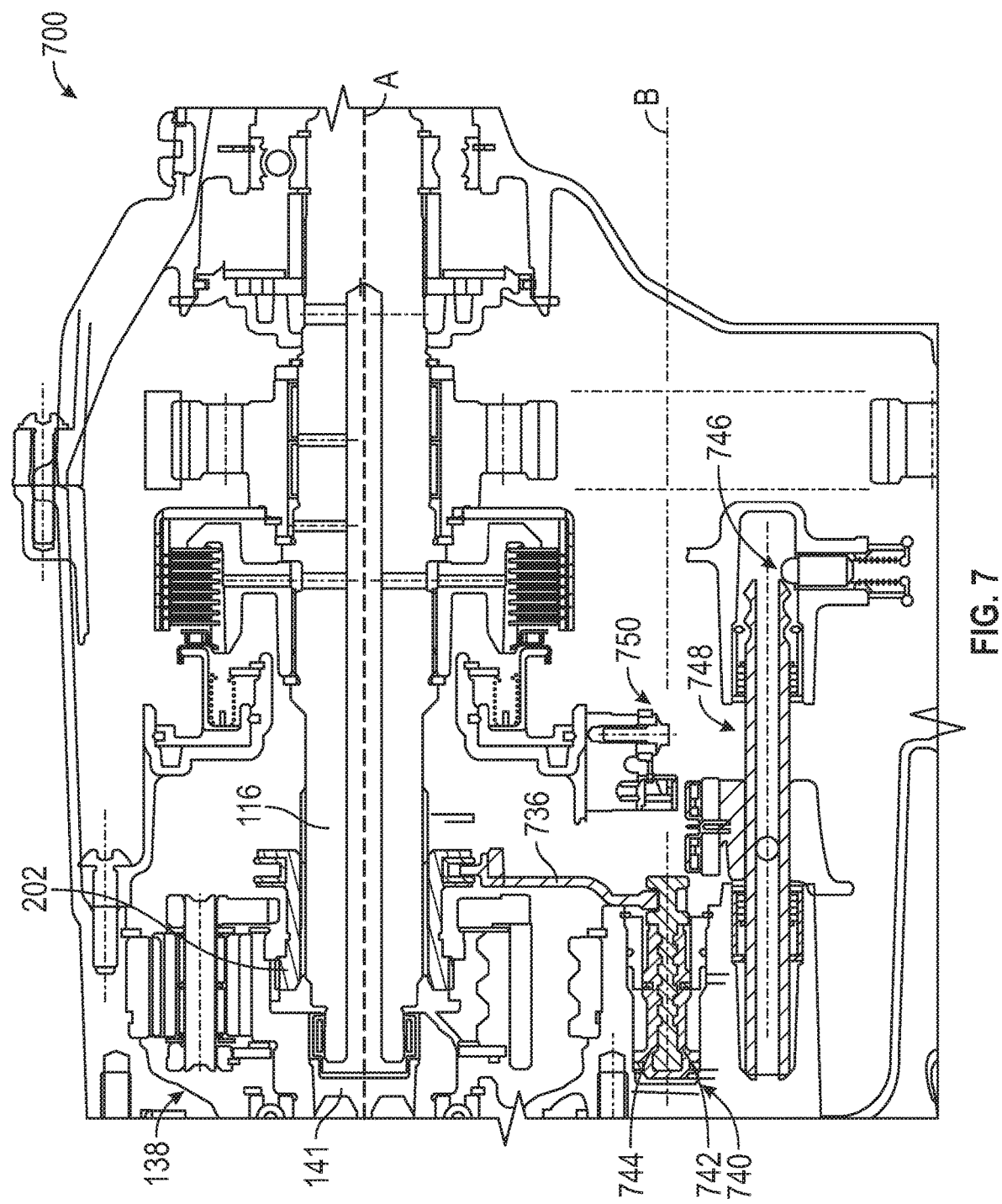
FIG. 7 is an alternative embodiment of a torque transfer case.

FIG. 7 shown an alternative embodiment of a torque transfer case 700. Similar to the first embodiment, the input shaft 141 includes a planetary gear set 138 and the rear output shaft 116 includes a dog clutch 202 splined onto the output shaft. The dog clutch 202 is operable to translate in the first axial direction and a second axial direction to a first position, a second position, and a third position or neutral position. In this embodiment, the dog clutch 202 is shifted by a shift fork 736 that is actuated by a multi-piston actuator 740 that is aligned with a longitudinal axis-B that is radially spaced from and parallel to the axis-A. The multi-piston actuator 740 includes an internal piston 742 and an external piston 744. The multi-piston actuator 740 further includes a detent mechanism 746 engageable to a distal end 748 of the shift fork 736 opposite the dog clutch 202 to retain the shift fork 736 in a position determined by the relative positions of internal and external pistons 742, 744. A range selector sensor 750, such as a Hall Effect sensor, may be provided to detect the positon of the shift fork 736.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A drive torque transfer case for a vehicle having a transmission, comprising:
    an input shaft extending along a longitudinal axis A;
    an output shaft co-axially aligned with the input shaft;
    a gear assembly coupled to the input shaft;
    a range clutch assembly coupled to the output shaft, wherein the range clutch assembly includes a clutch member and a multi-piston actuator configured to receive a pressurized transmission fluid from the transmission for selectively axially translating the clutch member to engage a component of the gear assembly for transmitting a drive torque from the input shaft to the output shaft; and
    a transfer case housing;
    wherein the gear assembly includes a sun gear rotationally fixed to the input shaft, a ring gear non-rotationally fixed to the transfer case housing, and planetary gear carrier having a plurality of planetary gears meshed between the sun gear and the ring gear;
    wherein the clutch member is a dog clutch splined to the output shaft and axially translatable in a first axial direction and in an opposite second axial direction;
    wherein the multi-piston actuator is configured to selectively axially translate the dog clutch into a first position, a second position, and a third position; and
    wherein the first position is in engagement with the sun gear, the second positon is engagement with the planetary carrier, and the third position is in a neutral position; and
    wherein the multi-piston actuator comprises:
        a piston housing defined by a portion of an interior surface of the transfer case housing;
        an internal piston disposed within the piston housing, wherein the internal piston is axially slideable within the piston housing; and
        an external piston disposed within the piston housing, wherein the external piston is axially slideable against a surface of the internal piston;
        wherein the external piston includes an exterior surface defining a shift fork in engagement with the dog clutch, and
        wherein the internal piston co-operates with the external piston to selectively axially translate the dog clutch into the first position, the second position, and the third position.

2. The drive torque transfer case of claim 1, wherein the internal piston and the external piston are co-axially located about the longitudinal axis-A.

3. The drive torque transfer case of claim 1, wherein the internal piston and the external piston are co-axially located about a longitudinal axis-B radially spaced from and parallel to the longitudinal axis-A.

4. The drive torque transfer case of claim 2, further comprising:

a piston sleeve disposed against a first surface of the piston housing, wherein the first surface of the piston housing is oriented toward longitudinal axis-A; and a piston housing end cap fitted against the piston sleeve adjacent an open end of the piston housing;

wherein the external piston cooperates with the interior piston, end cap, and piston sleeve to define a first hydraulic chamber; and wherein the external piston cooperates with the interior piston, an interior surface of the close end of the piston housing, and the piston sleeve to define a second hydraulic chamber.

5. The drive torque transfer case of claim 4, wherein:

the internal piston includes a first annular surface area A1 oriented toward the end cap and a third annular surface area A3 oriented toward the closed end; and the external piston includes a second annular surface area A2 oriented toward the end cap and a fourth annular surface area A4 oriented toward the closed end;

wherein the first annular surface area A1 and the second annular surface area A2 are in hydraulic communication with the first hydraulic chamber, and wherein the third annular surface area A3 and fourth annular surface area A4 are in hydraulic communication with the second hydraulic chamber.

6. The drive torque transfer case of claim 5, wherein:

the third annular surface area A3 is greater than the first surface annular area A1;

the second annular surface area A2 is greater than the fourth annular surface area A4; and a total of the first annular surface area and second annular surface area (A1+A2) is less than a total of the third annular surface area and fourth annular surface area (A3+A4).

7. The drive torque transfer case of claim 6, further comprising:

a mode clutch assembly having:

a clutch housing rotationally fixed to a drive sprocket;

a hub rotationally fixed to the output shaft;

a multi-plate clutch pack configured for selectively transmit drive torque from the hub to the clutch housing; and a mode-piston actuator configured to actuate the multi-plate clutch pack;

wherein the mode-piston actuator is configured to receive a pressurized transmission fluid for selectively axially translating a piston to engage the multi-plate cutch pack for transmitting a drive torque from the hub to the clutch housing and thus drive sprocket.

8. The drive torque transfer case of claim 6, further comprising a valve body defined in the transfer case housing for selectively hydraulically communicating the first hydraulic chamber, second hydraulic chamber, and the mode-piston actuator with a source of pressurized transmission fluid.

9. A multi-piston actuator for a transfer case, comprising:

a piston housing disposed about an axis-A, wherein the piston housing includes a first surface facing the axis-A, a second surface facing away from the axis-A, a closed end having a closed end surface interconnecting the first surface and the second surface, and an open end opposite the closed end;

a piston sleeve disposed against the first surface;

an end cap fitted against the piston sleeve adjacent the open end of the piston housing;

an external piston disposed within the piston housing, wherein the external piston includes an external surface defining a shift fork; and an internal piston co-axially disposed with the external piston within the piston housing, wherein the external piston cooperates with the internal piston to selectively axially translate the shift fork into a first position, a second position, and a third position.

10. The multi-piston actuator of claim 9, wherein:

the external piston cooperates with the interior piston, end cap, and piston sleeve to define a first hydraulic chamber;

the external piston cooperates with the interior piston, an interior surface of the close end, and the piston sleeve to define a second hydraulic chamber; and the piston housing defines a valve body and a network of passageways in hydraulic communication with the valve body, the first hydraulic chamber, and the second hydraulic chamber, wherein the valve body is configured to receive a pressurized transmission fluid and selectively communicate the pressurized transmission fluid with the first and second hydraulic chambers.

11. The multi-piston actuator of claim 10, wherein:

the internal piston includes a first annular surface area A1 oriented toward the end cap and a third annular surface area A3 oriented toward the closed end; and the external piston includes a second annular surface area A2 oriented toward the end cap and a fourth annular surface area A4 oriented toward the closed end.

12. The multi-piston actuator of claim 11, wherein:

the third annular surface area A3 is greater than the first annular surface area A1;

the second annular surface area A2 is greater than the fourth annular surface area A4;

a total of the first annular surface area and second annular surface area (A1+A2) is less than a total of the third annular surface area and fourth annular surface area (A3+A4); and a sum of the second surface area (A2) minus the fourth surface area (A4) plus the first surface area (A1) is less that than the third surface area (A3) as represented by $[(A2-A4)+A1]<A3$).

13. The multi-piston actuator of claim 11, wherein:

wherein the first annular surface and the second annular surface are in hydraulic communication with the first hydraulic chamber, and wherein the third annular surface and fourth annular surface are in hydraulic communication with the second hydraulic chamber.

14. The multi-piston actuator of claim 11, wherein the internal piston cooperates with the piston sleeve to define a third hydraulic chamber;

wherein the external piston cooperates with the internal piston to define a fourth hydraulic chamber; and wherein the internal piston defines a hydraulic passageway in hydraulic communication with the third and fourth hydraulic chambers.

15. The multi-piston actuator piston of claim 14, wherein the valve body is further configured to selectively vent hydraulic transmission from the third hydraulic chamber and the fourth hydraulic chamber.

16. A hydraulically actuated transfer case, comprising:

a range clutch assembly having a multi-piston actuator configured to receive a pressurized transmission fluid from a transmission for selectively axially translating a clutch member; and a mode clutch assembly having a mode-piston actuator configured to receive the pressurized transmission fluid for selectively axially translating a piston;

wherein the range clutch assembly includes:

a piston housing having an open portion and an opposite closed portion;

a piston sleeve disposed against a first surface of the piston housing;

a piston housing end cap fitted against the piston sleeve adjacent the open portion of the piston housing;

an internal piston slideably disposed against the piston sleeve;

an external piston slideably disposed against the internal piston and a portion of the piston housing end cap;

a first hydraulic chamber defined between the piston sleeve, piston housing end cap, internal piston, and external piston; and a second hydraulic chamber defined by defined between the piston sleeve, the closed portion of the piston housing, internal piston, and external piston.

17. The hydraulically actuated transfer case of claim 16, wherein the internal piston includes a first annular surface area A1 oriented toward the end cap and a third annular surface area A3 oriented toward the closed end; and wherein the external piston includes a second annular surface area A2 oriented toward the end cap and a fourth annular surface area A4 oriented toward the closed end;

wherein the third annular surface area A3 is greater than the first annular surface area A1;

wherein the second annular surface area A2 is greater than the fourth annular surface area A4; and wherein a total of the first annular surface area and second annular surface area (A1+A2) is less than a total of the third annular surface area and fourth annular surface area (A3+A4).

* * * * *